United States Patent [19]
Becker

[11] 4,445,871
[45] May 1, 1984

[54] TACTILE COMMUNICATION

[76] Inventor: John V. Becker, 280 Riverside Dr., New York, N.Y. 10025

[21] Appl. No.: 320,199

[22] Filed: Nov. 12, 1981

[51] Int. Cl.³ ............................................. G09B 21/00
[52] U.S. Cl. .................................. 434/114; 242/54 R; 369/47; 400/122; 400/472
[58] Field of Search ................. 434/113, 114; 400/122

[56] References Cited

U.S. PATENT DOCUMENTS

| | | | |
|---|---|---|---|
| 3,197,889 | 8/1965 | Micropoulou | 434/113 |
| 3,363,339 | 1/1968 | Place | 434/113 |
| 4,159,471 | 6/1979 | Whitaker | 340/711 |
| 4,215,490 | 8/1980 | Fewell | 434/114 |

FOREIGN PATENT DOCUMENTS 741288  11/1955  United Kingdom ............... 434/114

*Primary Examiner*—William H. Grieb

[57] ABSTRACT

Tactile communication is realized via one or more tactile cells each of which comprises one or more tactually perceptible indicia, each cell being further adapted to include means for tactually conveying font information corresponding to that cell, the font information preferably being in the form of a tactile sensation indicative of the font and brought about one or more cell indicia.

72 Claims, 36 Drawing Figures

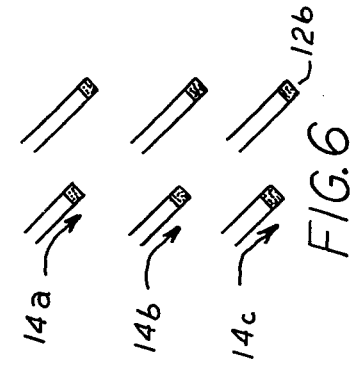
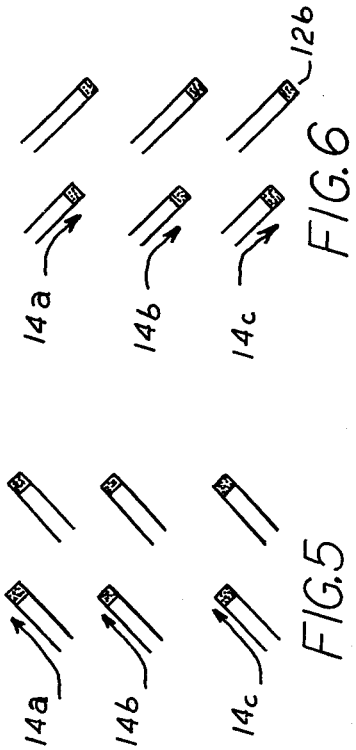
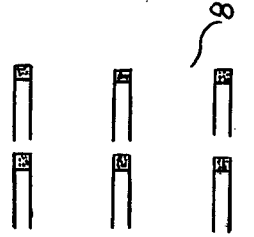
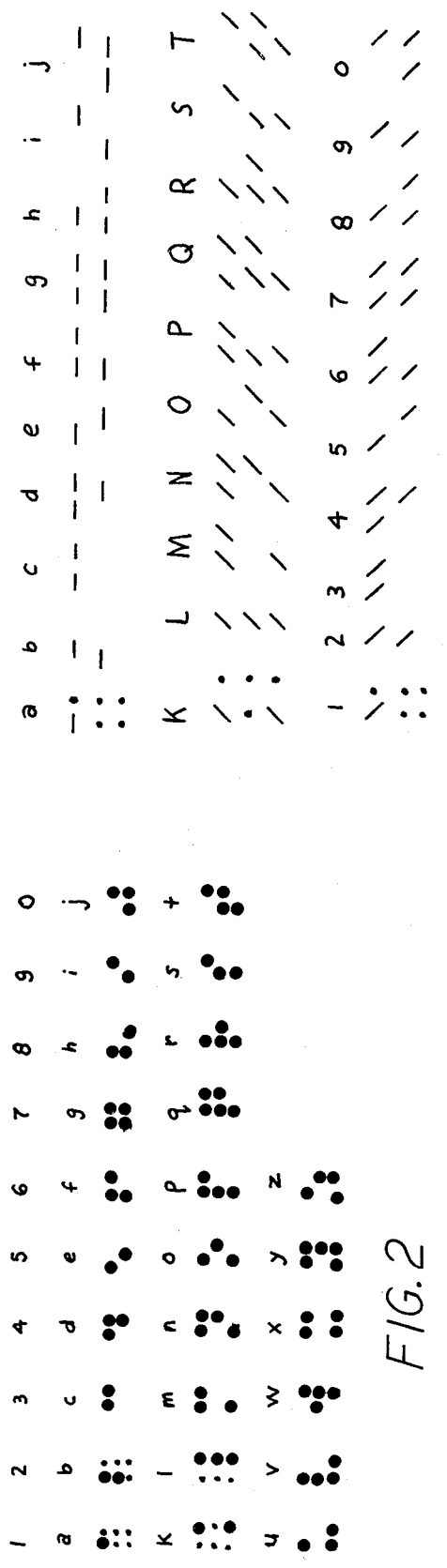

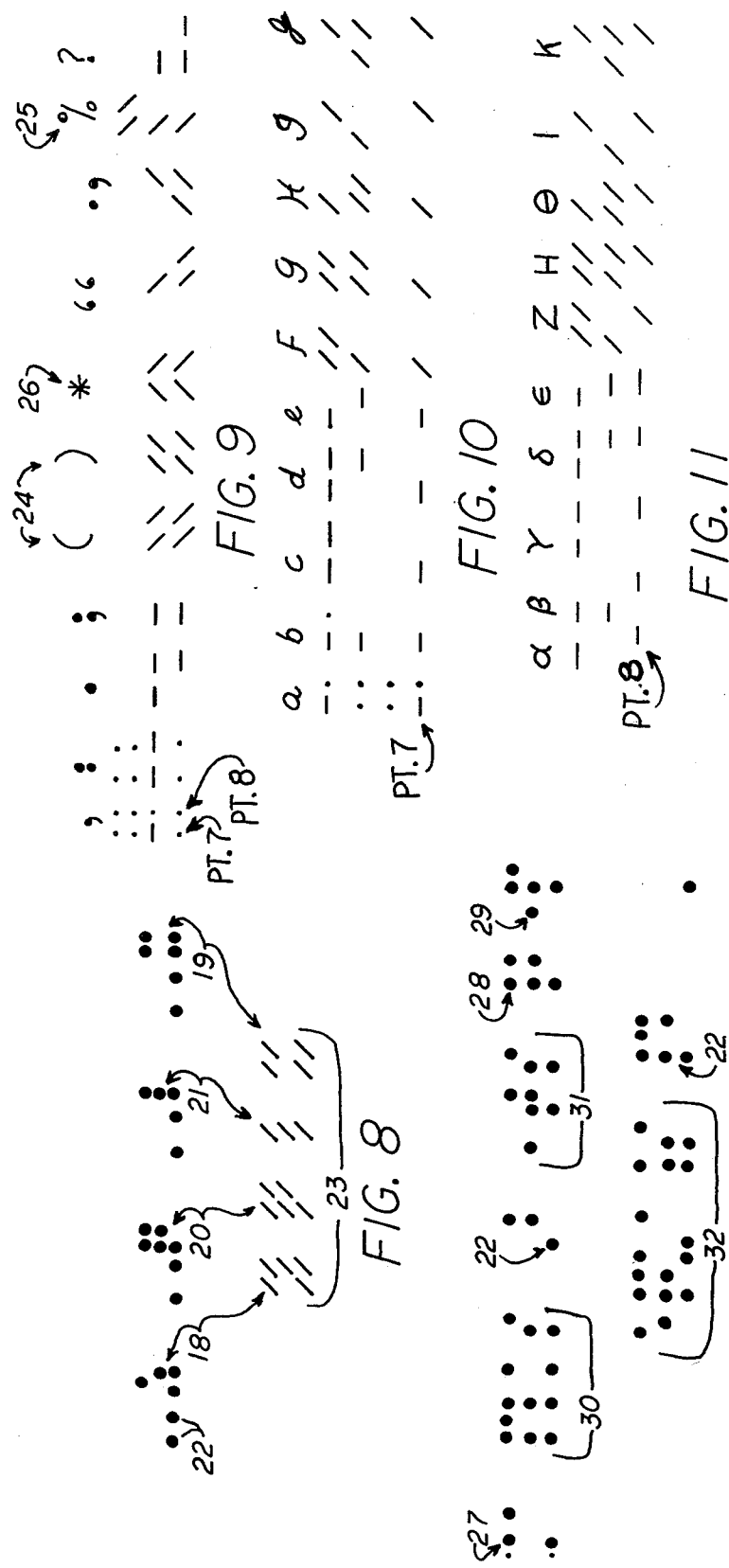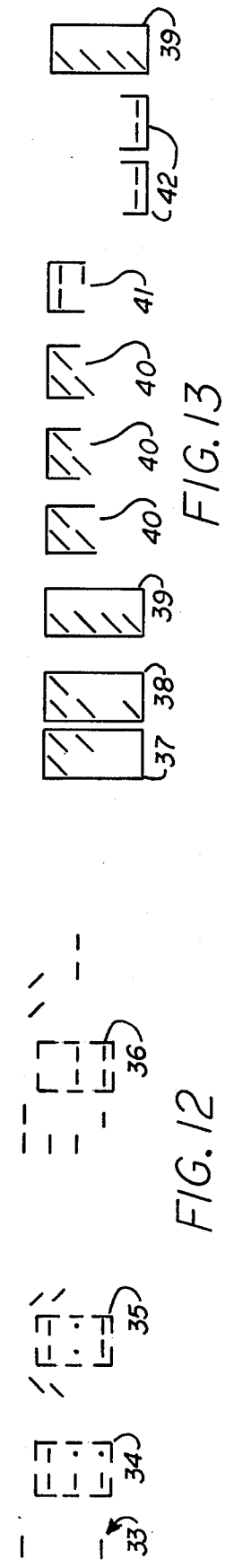

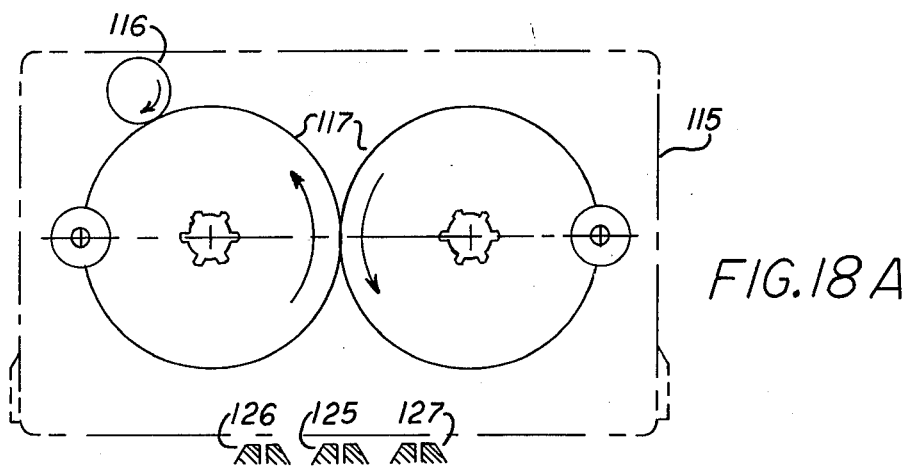
FIG. 18A
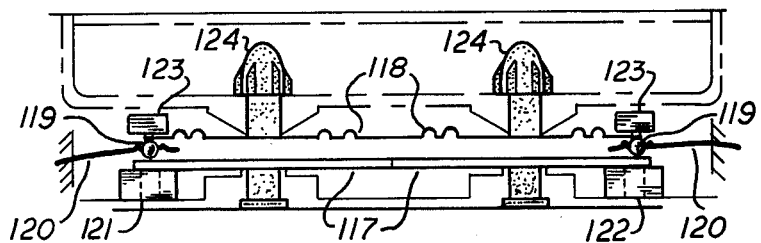
FIG. 18B
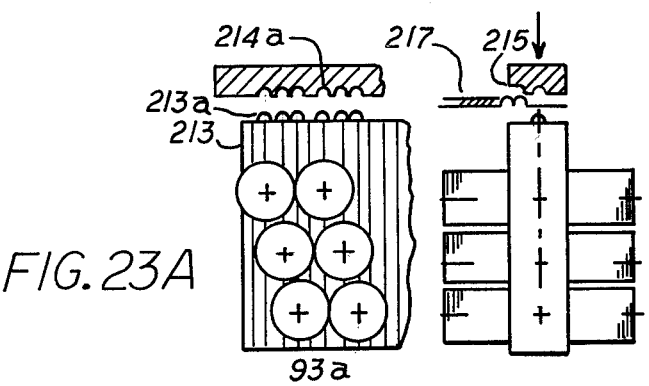
FIG. 23A
FIG. 23B

TACTILE COMMUNICATION

BACKGROUND OF THE INVENTION

This invention pertains to practices for generating information and, in particular, to methods and apparatus for generating information which is to be ascertained through tactual identification or sensation.

Practices for providing information in a tactual form (i.e., in a form identifiable by touching), or in a form convertible to tactual form, are known in the art and have been used extensively to enable communication with the blind. A majority of these practices are based upon the Braille system. In the Braille system, information is conveyed via paper embossments or raised indicia. Usually, all of the embossments are configured to provide the same tactile sensation, each embossment being part sphere in shape with a diameter of 1.25 mm and a height of 0.50 mm when new and unworn.

The embossments in the Braille system are arranged in a basic Braille cell comprised of two columns of three embossments and different times of information are conveyed by eliminating different groups of one or more embossments. More particularly, different permutations of the embossments of the basic cell define corresponding individual letters, part words, whole words, syllable contractions, signs and punctuation. There are 63 permutations which form the alphabet of the system. In the English system, 26 correspond to the English lower case letters a through z and the rest are utilized for the remaining characters (whole words, part words, etc.)

While the Braille system has proved to be a powerful communication tool, it has certain characteristics which tend to make the system slow and cumbersome. Thus, the system uses the same cell permutations for lower case, upper case, numeric and italic fonts. This requires that a corresponding identifier or composition cell precede every cell indicative of a capital, numeric or italic (e.g., the date Apr. 15, 1980 in Braille must be rendered as (C) April (#) ae (#) achj.) Communication is thereby slowed by the small, but incrementally significant periods of time required to sense and comprehend each of these modifiers. Additionally, considerable mental accomodation on the part of the reader is also required.

The Braille system furthermore suffers from the problem of bulk. Hence, it takes approximately 700 single sided pages bound into seven 2½ inch thick eleven by eleven and a half inch binders to equal the contents of a 250 page pocket book. This, in turn, has forced the size of the embossments to be reduced to the abovementioned diameter in order to reduce the number of embossed pages.

As above-mentioned, many systems have been devised to enable tactile communication via the Braille system. Some of these systems are directed to practices for Braille embossment on hard copy and these systems are highly complex and costly. Other systems have attempted to reduce the bulk problem by recording representations of the Braille permutations on magnetic tape or punched tape and utilizing the tape to then activate a Braille reader. Such a reader might be in the form of a stationary six point key arrangement situated at a reading station or in the form of movable belt carrying activated pins or embossments past a reading window. Suggestions have also been made to provide a composite system incorporating both a writer for writing on magnetic tape and a reader for reading therefrom.

While the above systems have provided some measure of usefulness in facilitating tactile communication and, in particular, tactile communication by the Braille system, there still is an urgent need for systems and methods which permit faster and easier communication and which are less expensive, more compact and less complicated than present day systems.

It is therefore an object of the present invention to provide a practice for tactile communication which permits increased speed and understanding.

It is a further object of the present invention to provide an apparatus for tactile communication which is compact, relatively inexpensive and relatively simple in construction.

It is also an object of the present invention to provie an improved apparatus for embossing a medium;

It is a further object of the present invention to provide an improved tape transport system for tactile and other communication systems.

It is a further object of the present invention to provide an improved tactile reader, an improved tactile writer, and a combination of improved tactile reader and writer.

It is a further object of present invention to provide a tactile system which is compatible with other communication systems.

SUMMARY OF THE INVENTION

In accordance with a first aspect of the present invention, the above and other objectives are realized through the use of one or more tactile cells each of which comprises one or more tactually perceptible indicia, each cell being further adapted to convey font information corresponding to that cell, the font information being in the form of a tactile sensation indicative of the font and brought about by one or more of the cell indicia. More particularly, at least first and second tactile cells are provided, the indicia of the first cell being of a character to provide a first tactile sensation indicative of a first font for the first cell and the indicia of the second cell being of a character to provide a second tactile sensation indicative of a second font for the second cell. In this way, the first and second cells are adapted to carry their own font information and the need to provide a preceding cell indicative of that fact is thereby eliminated. The speed of tactile communication is thus increased, while the requirements of medium length are decreased, thereby providing an overall enhanced tactile system.

In the embodiment of the invention to be disclosed hereinafter, the indicia of each cell are of the same shape and, in particular, are of ramp configuration, and the different tactile sensations for the different cells are realized by relative rotation of the indicia of the cells. Furthermore, in this embodiment of the invention, six indicia per cell are utilized in conjunction with standard Braille permutations.

In a further modification of this embodiment of the invention, one or more further indicia are added to the six indicia array, these further indicia providing further font definition or information.

In yet a further modification of this embodiment of the invention, the size of the indicia are controlled to provide enhanced recognition.

In accordance with further aspects of the present invention, a tactile reader, a tactile writer and the combination of reader and writer are disclosed for operation with either the tactile cells of the invention or with conventional tactile cells. The reader and writer are each constructed to be of compact configuration and to be relatively inexpensive so as to facilitate user acquisition and use.

The writer comprises a keyboard having a tongue along its back edge provided with conductive strips and the reader with a slot on its bottom end wall also provided with corresponding conductive strips. Inserting the tongue of the writer in the slot of the reader provides a readily assembled reader/writer combination.

The reader is additionally characterized by unique print head and tape transport assemblies which add to its compactness. Further employed is a plurality of tactile cell blocks each of which houses embossing members or pins. These blocks are carried by an endless band having perforations for receiving the embossing pins. The band carries the blocks across a reading window at which time the embossing pins are actuated by the print head to develop the tactile cell permutations corresponding to the characters being read. For reading in accordance with the cells of the invention, the embossing pins are rotatably mounted and a comb fonting assembly suitability rotates the pins to provide a given font.

The print head assembly includes electromagnets shuttling a ball along an axis parallel to the axis of the magnets and between first and second positions. In the first position, the ball actuates and locks a transversely disposed pin actuating member in a position for pin engagement and, in the second position, the ball releases the actuating member.

The tape transport assembly employs a single motor and a unique clutch assembly again for promoting compactness and reduced cost.

The keyboard of the tactile writer is provided with tapered members surrounding each key so as to prevent multiple key activation.

BRIEF DESCRIPTION OF THE DRAWINGS

The above and other features and aspects of the present invention will become more apparent upon reading the following detailed description in conjunction with the attached drawings in which:

FIG. 2 shows the conventional Braille permutations in embossed cell form and the characters (alphabetical and numerical) corresponding thereto;

FIG. 3 shows enlarged plan and elevation views of one of the Braille cells of FIG. 2;

FIGS. 4, 5 and 6 illustrate, respectively, enlarged plan and elevation views of different tactile cells adapted in accordance with the principles of the present invention.

FIG. 7 shows the tactile cells of FIGS. 4, 5 and 6 utilized to provide different character fonts;

FIG. 8 illustrates the Braille cells needed to convey a particular statement and the equivalent tactile cells of the invention needed to convey the same statement;

FIGS. 9, 10 and 11 illustrate the tactile cells of FIGS. 4, 5 and 6 provided with additional cell indicia;

FIGS. 12 and 13 illustrate use of the tactile cells of the invention for conveying mathematical equations and musical notations;

FIGS. 18A and 18B illustrate vertical and plan views of the tape transport assembly of the reader of FIGS. 14A–14D;

FIGS. 23A and 23B shows the print head assembly of FIGS. 17A–C adapted to print hard copy.

DETAILED DESCRIPTION

Figure 1:
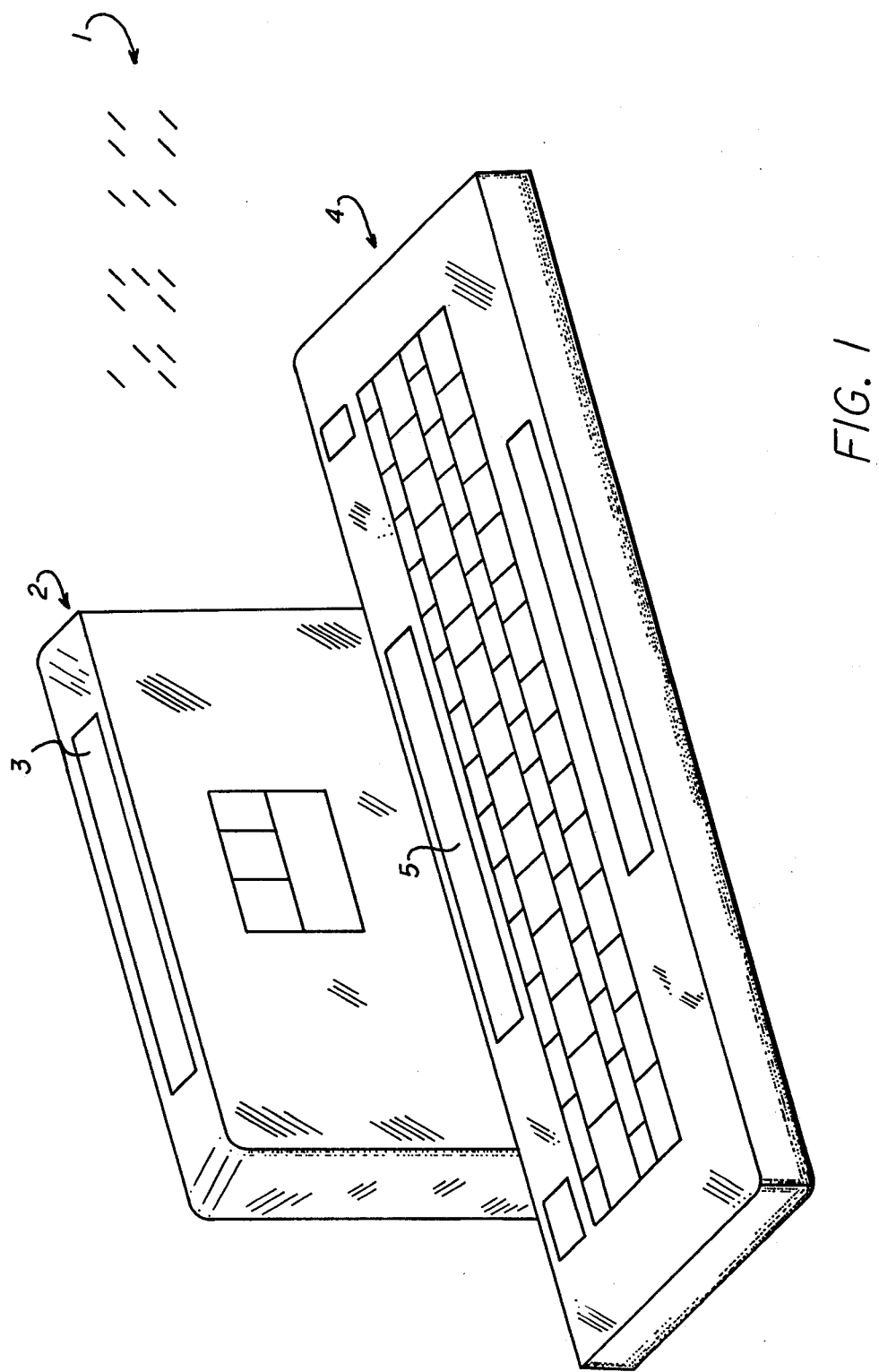
FIG. 1 illustrates a tactile communication system in accordance with the principles of the present invention.
Figure 14A:
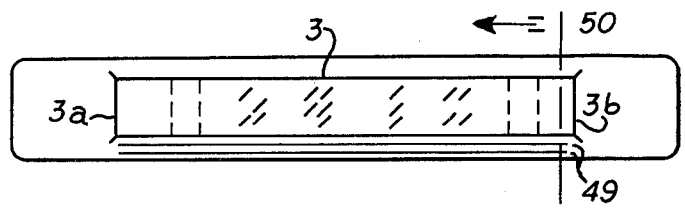
FIGS. 14A through 14D illustrate top plan, side elevation, bottom plan and end elevation views of the tactile reader of FIG. 1.
Figure 14B:
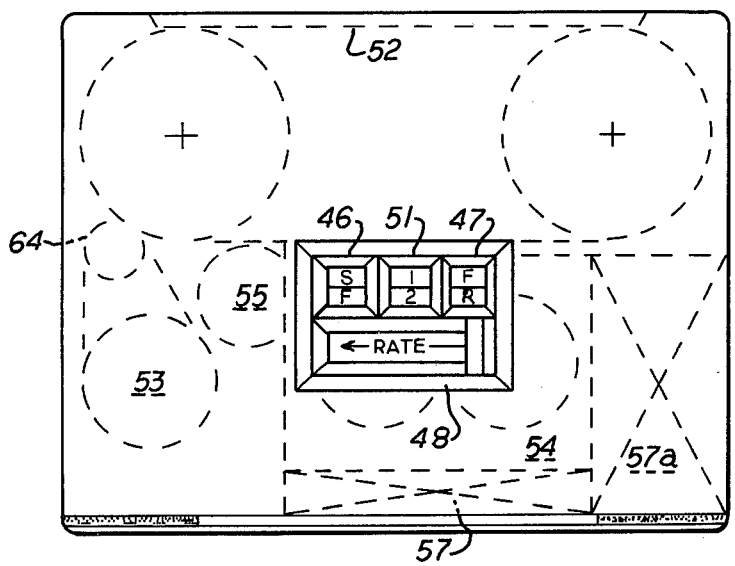
Figure 14D:
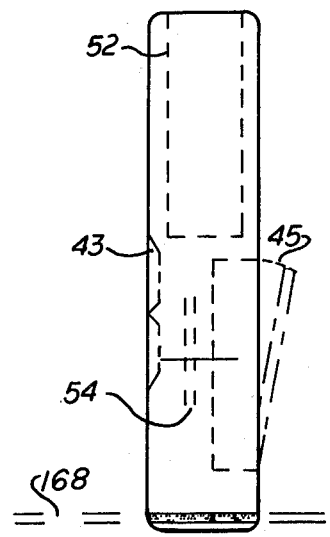
Figure 14C:
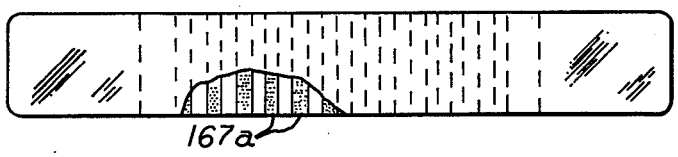

FIG. 1 illustrates a tactile communications system having components and employing tactile cells 1 in accordance with the principles of the present invention. As will be discussed hereinafter, the tactile cells 1 are designed to facilitate tactile perception (i.e., reading) of same, whereby significantly increased reading rates become possible.

A tactile reader 2 stores information which can be continuously or intermittently printed out in the form of tactile cells and read by fingertip placement across a readout window 3. Writing information to be stored in the reader is through a tactile writer 4 which is detachably mounted to the reader and which has a visual readout window 5. The reader/writer combination thus enables both the sighted and the blind to communicate directly in either tactile or sightprint form.

FIGS. 2 through 13 deal in greater detail with the tactile cell developed in accordance with the principles of the present invention. More particularly, FIG. 2 shows certain permutations of the standard six indicia Braille cell. As drawn, these permutations correspond to the lower case font of the English characters a through z. The other base six Braille permutations have been omitted in the interest of brevity, but they too denote characters (whole words, part words, etc.) in the lower case English font. These additional permutations as well as those illustrated in FIG. 2 are set forth in the "Instruction Manual for Braille Transcribing," 1976 edition (Library of Congress card number 70-152129).

FIG. 3 depicts the six indicia Braille cell 6 in enlarged form. As can be seen, the indicia 7 are arranged in two columns of three indicia, the indicia positions being identified as points 1 through 6. The indicia 7 are further each part sphere in shape and each provides the same tactile sensation.

In conventional Braille practice, the absence of a modifier cell preceding a Braille 6 cell indicates that the Braille 6 cell is in lower case font. Suitable modifier or composition cells, in turn, provide the additional fonts (upper case, numerics, italics, etc.). Thus, by placing suitable modifiers in front of the permutations of FIG. 2, the combination of permutations will be tactually read as upper case characters, italic characters or numeric characters (the permutations for the letters a-j also represent the numbers 1-9 and 0 when preceded by the appropriate modifier). Reading of the modifiers, however, itself consumes incrementally small, but consequential amounts of time and, therefore, the overall reading process is slowed. Furthermore, the need for modifiers adds to and increases the size of the physical medium needed to present the cells.

In accordance with the principles of a first aspect of the present invention, tactile cells are contemplated which themselves carry their own particular font information. In particular, the indicia of the cells are adapted to provide different tactual sensations and, therefore, can be associated with different character fonts. Thus, the indicia of a first cell are adapted to provide a first tactual sensation associated with a first character font (e.g., the lower case character font), the indicia of a second cell are adapted to provide a second tactual sensation associated with a second character font (e.g., the upper case character font), etc. In this way, modifiers are no longer needed to precede a cell for font identification, since each and every cell by the tactual sensation of its indicia itself conveys the font information. Thus, the reading of modifiers and the inclusion of cells for same is eliminated and reading speed and time, as well as text length, are considerably reduced.

In preferred form, the indicia of the tactile cells of the inention have the same shape or configuration, but the shape is such that for different orientations an apparent change in shape is tactually perceived. Hence, with the indicia oriented in a first direction, a cell representing the first character font will be recognized, with the indicia orientated in a second direction, a cell representing a second character font will be recognized, and so on.

FIG. 4 shows a desirable form of indicia usable to produce tactile cells in accordance with the invention. As can be seen, the indicia have the shape of a thin ramp and, in FIG. 4, are situated in the six point cell arrangement 8 with the ramp profile 9 arranged horizontally and the high ramp end to the right. With this orientation, a first tactual sensation is thus perceived when moving across the cell in the normal reading direction 10 (i.e., from left to right).

FIGS. 5 and 6 show cells 12a and 12b having the same ramp indicia of FIG. 4, but in these cases the ramps have been differently oriented, i.e., have been rotated, so as to provide different tactual sensations. Thus, in FIG. 5, the ramps have been rotated forty-five degrees counterclockwise relative to the horizontal as shown by the arrows 14a and in FIG. 6 forty-five degrees clockwise relative to the horizontal as shown by the arrows 14b. These rotations cause different changes in tactile pressure angle when moving from left to right across their respective cells. The cells thus appear tactually to have changed shape and provide second and third tactual sensations.

By utilizing the cells of FIGS. 4-6 to denote different character fonts (e.g., lower case, upper case and numerics) and further utilizing the standard Braille permutations, a tactile presentation is achieved having the power of the standard Braille, but which is more easily and quickly readable, as the modifiers previously used for the font information have been eliminated. FIG. 7 illustrates developments of such a tactile presentation. Thus, in this figure, the cell of FIG. 4 is utilized at 15 for the lower case font of the Braille cell permutations (only permutations for letters a-j are shown), the cell of FIG. 5 is utilized at 16 for the upper case font (only permutations for letters K-T are shown) and the cell of FIG. 6 is utilized at 17 for the numerics font (1-9 and 0). In the case of the latter font, only 10 Braille permutations are actually utilized. The remaining permutations can, therefore, be utilized with this cell to provide a separate extended instruction system for higher mathematical or data processing purposes.

FIG. 8 illustrates the benefits resulting from the tactile cells of the invention, as compared with the conventional Braille cells. The top line in this figure shows the statement AS YOU LIKE IT in current Braille format. Thus, 18 and 19 represent the Braille wholeword cell permutations for as and it, respectively, while 20 and 21 represent the permutations for you and like (these permutations represent letters y and 1, but when used singly denote the words you and like). Eight additional composition cells 22, however, must also be provided in order to denote that each word is in upper case font. The second line 23 of this figure illustrates the same expression with tactile cells adapted in accordance with the invention. In particular, each word is simply represented by its single cell Braille permutation, with the upper case font information being conveyed by the tactual sensation of the FIG. 5 cell. Thus, no composition modifiers need be used and economies in reading and medium length are realized.

The tactile cells of the invention in FIGS. 4-8 have all been illustrated in terms of a six indicia cell and it has been demonstrated that increased reading speed and reduced bulk can be realized by utilizing cells of different tactual sensation to define different character fonts. It has also been pointed out that for fonts which use less than all the standard permutations (i.e., the numerics font, for example), the remaining permutations can be used to convey further information not previously available (i.e., in the case of the numerics font, the additional permutations can be used for extended instructions for a higher mathematical system).

In accordance with a further aspect of the invention, the six indicia tactile cell of the invention is added to by providing the cell with two further indicia, one at the bottom of each existing indicia column. In FIG. 9, these additional indicia are designated at points 7 and 8 and are utilized with the immediately preceding indicia of the cell to provide punctuation marks, as well as other symbols commonly found on a standard typewriter. Furthermore, these permutations are shifted down one row from their positions in the standard Braille cell. This situates them on or below the prose line position, thereby placing them at a subliminal level and ameliorating their intrusion in the prose mainstream.

In FIG. 9, in addition to the standard Braille permutations used for certain of the illustrated punctuation marks, a set of new permutations is also shown. Thus, permutations 24 are used to convey open and closed parenthesis, a single permutation 25 is used to convey a percent sign instead of the two cell permutations normally required, and a permutation 26 is used to convey an asterisk, the latter asterisk permutation containing indicia associated with different fonts. Obviously, a variety of other permutations utilizing the cell indicia at points 7 and 8 and with or without a mixture of fonts can be developed for conveying various other pieces of information.

FIGS. 10 and 11 show other ways of utilizing the added indicia at cell points 7 and 8. In FIG. 10, the presence of an indicium at point 7 and the absence of an indicium at point 8 in the permutations for upper and lower case letters has been used to indicate a further font and, in particular, an italics font for same. On the other hand, in FIG. 11, the presence of an indicium at point 8 and the absence of an indicium at point 7 has been used to indicate a foreign language font and, in particular, a Greek font for the letters. Use of the points 7 and 8 in this manner eliminates further composition signs required in the standard Braille system, further facilitating reading and reducing bulk.

FIG. 12 illustrates a further example of the method of use of the tactile cells of the invention and added cell points 7 and 8 in terms of utilizing same to present mathematical expressions. In particular, the first and second lines depict the standard Braille format for the mathematical expression $a+B\times 2\pi=4$. As can be seen this requires the use of 24 permutations and seven spaces. The italic a, the upper case B, the Greek pi and the numbers must each be preceded by respective composition permutations (27, 22, 28 and 29) and the signs +, × and = (30, 31 and 32) must be presented in terms of their full word equivalents. The same expression represented in terms of the tactile cells of the invention (shown in the third line in FIG. 12), makes the presentation with the exact economy of the printed word, i.e., with eight symbols (permutations) and no spaces. Each permutation carries its own font or fonts and new permutations 34, 35 and 36 utilizing the lower six indicia of the eight indicia cell carry the signs +, × and = and demonstrate the possibility of developing a symbology with such lower indicia.

In FIG. 13, a further example demonstrates the musical notation application of the tactile cells of the invention. In this figure, the musical statement reads from left to right D major 37, F fortissimo 38, bar 39, f sharp 40, f sharp 40, f sharp 40, d natural 41 sustained 42, sustained 42 and bar 39 and thus represents the first four notes of Beethoven's Fifth Symphony. It is to be noted that the octave scale letters c, d, e, f, g, a and b can be shown as natural when in lower case 41, as sharp when in upper case 40 and flat when in the numerics font (not shown) and thus are always presented in key and the repeated stave/line notations required of sheet music, which also has to include tempo, measure, register, etc., can thus be drastically reduced.

The above presentation has described the tactile cells of the invention and the adaptation of same to carry font information. A further aspect of the invention lies in the dimensioning of the indicia of the cell so as to further facilitate reading and thereby increase speed. In accordance with this aspect of the invention, the spacing between successive indicia of a tactile cell is selected to maximize the ability to perceive such cells and is set at substantially the mean threshold level for two point sensory detection. In particular, this level has been determined by S. Weinstein (S. Weinstein, *The Skin Senses*, D. R. Keshaolo (Ed.), Springfield, Ill., Charles C. Thomas, 1968), as having an average value for average persons at their fingertips of 3.5 mm, which is considerably greater than the 2.5 mm spacing of successive indicia for the standard Braille cell. By spacing cells at this threshold level greater sensitivity is thereby achieved.

It is noted that increased spacing does increase the length of the medium carrying the permutations, but this increase can be compensated for by using the font-carrying tactile cells of the invention and, furthermore, can be made to be of negligible concern when using the continuous tactile reader of the invention to be discussed hereinafter.

As can be appreciated, the tactile cells of the invention and methodologies regarding same discussed above can be incorporated into existing tactile communication systems to derive the benefits of economy in reading and reducing bulk. Thus, embossed hard and soft copy material made with conventional embossing mechanisms can be used to incorporate the present tactile cells. However, in accordance with still further features of the present invention, the tactile communication system of FIG. 1 is adapted to print these cells, as well as conventional cells, via compact, inexpensive and rapidly operating component assemblies and, in particular, the tactile reader and the tactile writer of FIG. 1, which will now be discussed in greater detail.

FIGS. 14A through D show the general configuration of the tactile reader 2. The reader incorporates features which are specifically adapted to enable easy and ready access and use. Thus, the reader housing has no sharp corners, the controls are simple and recessed as at 43 to prevent accidental operation, and dirt traps have been avoided. The finish is such that it is easy to clean as with a damp cloth and the colors are such as to be pleasing to the user. The readout band might be black, the housing a soft light yellow or off-white, and the controls and writer connection a bright red or green. These colors would provide a feeling of contrast and warmth to those who are functionally blind, but who can still see some colors and light, and, as a result, instill a sense of orientation and possibly some pleasure. The reader may be recharged by a tape cassette type power supply and the overall housing can be about the size of an average hard cover sight-print book. Thus, it may be carried and used anywhere with the greatest convenience.

The general operation of the reader is as follows. With a prerecorded tape cassette placed in the door mechanism 45 which can be a conventional door mechanism used in cassette recorders, the door closed, the slow/fast and forward/reverse switches 46, 47 in the slow and forward positions and the rate slide switch 48 set at the desired readout speed, (the slide switch may also lock the cassette door), the user places his or her reading finger anywhere along the readout window 3 so that it or another finger bridges the two low current skin capacitance or thermal type switch strips 49. This action starts a readout of tactile cells moving across window 3 from right to left. The cells leave the window at window exit 3a where they reenter the housing to be reset and returned to the printpoint 50 at the window entrance 3b. Readout continues while the user's finger remains in place and stops when the user's finger ceases to bridge the switch strips or the recording ends, whichever occurs first. Switch 51 permits the tape readout bands to be shifted in a manner later described without requiring cassette reversal or prior rewind.

The main components of the reader are shown in dotted line in FIGS. 14A–D and include a display mechanism 52, a gearmotor 53 for driving the display mechanism, a tape transport assembly 54 and a second gearmotor 55 for driving the tape transport assembly. Areas 57 and 57a are also depicted for receiving the reader's electronics and rechargeable battery power supply.

Figure 15A:
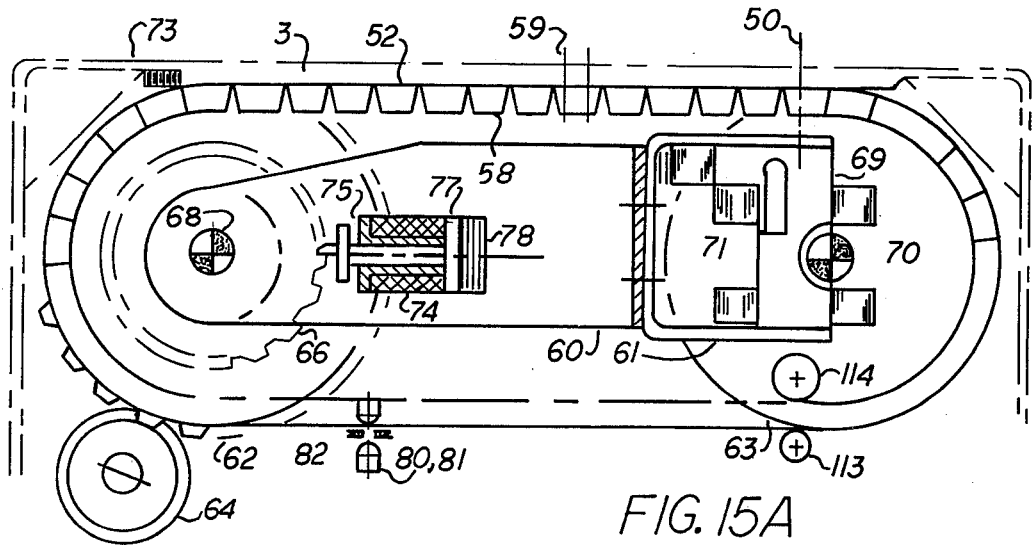
FIGS. 15A and 15B illustrate vertical and plan views of the display mechanism of the reader of FIGSS. 14A–14D.
Figure 15C:
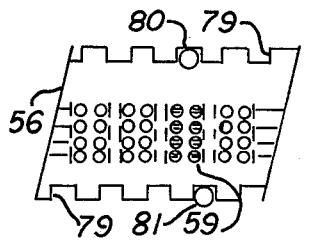
FIG. 15C shows the details of the display band of the mechanism of FIGS. 15A and 15B.
Figure 15B:
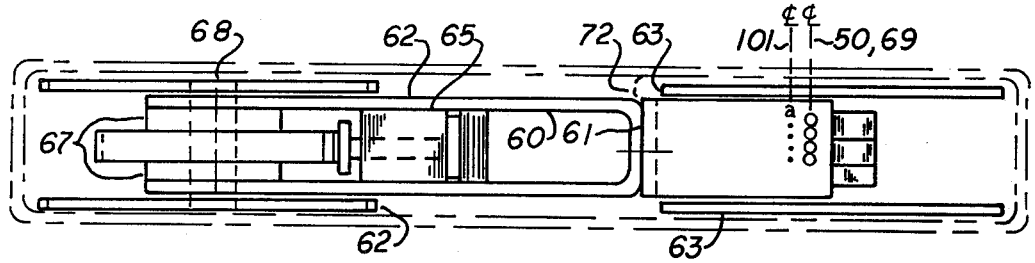

The display mechanism 52 is illustrated in greater detail in FIGS. 15A-C. The mechanism comprises a perforated endless band 56 made of any suitable non-stretch material, which carries on its interior a number of cell blocks 58 each of which contain eight cell point pins 59 arranged in two columns. Band 56 is held rigidly taut by two U-shaped brackets 60 and 61 which are also used to hold apart in the fixed manner shown a respective pair of head sprockets 62 and a respective pair of tail pulleys 63. The output gear 64 of the gearmotor 53 drives the head sprockets 62.

A pawl 65 is arranged to fail in its engaged position with a ratchet 66, the latter being coaxially mounted and fixed to a head spindle 68 to which is also mounted the head sprockets. Bearings 67 for head spindle 68 are carried by bracket 60. A printhead assembly 69 supported by and contained in bracket 61 includes half round bearings 71. The bearings 71 carry a tail spindle 70 to which are mounted the tail pulleys 63.

The display mechanism 52 which, as above-described, is self-contained, is mounted to the reader housing via a boss 72. Such mounting situates the band 56 in closely fitting relationship to the underside of the window 3, except at the window exit end. At this position a small pad of a brush-like material 73 permits the cell pins 59 to pass unchanged while preventing dirt from entering the housing.

In the present illustrative case, the gearmotor 53 driving the gear 64 is of the constantly stallable type (an over-running or magnetic clutch may also be used) which is constantly energized and thus when the pawl 65 is withdrawn from the ratchet 66, the head sprockets 62 are driven, thereby causing the band 56 to move for one or more cell/ratchet increments. The exact number of increments will depend on the energization period of the pawl actuator, shown as a double acting solenoid. The latter includes a coil 74, a core 75 and a nonmagnetic plunger 77 with a magnetic pole plate and an elastomeric pad 78, the plunger returning the pawl 65 to the ratchet engaged position when the solenoid is de-energized.

The display band 56 includes notches 79 for engagement by the teeth of sprocket pulleys 62. These notches are also used to locate the respective rows of pins of the cells 58. In particular, this is accomplished with a first photoelectric source and corresponding opposite switch 80 between which the notches on one side of the band pass and a like source and switch 81 between which the notches on the other side of the band pass. Light collimating slots 82 are also provided between each source and switch to increase switching point definition. (Hall-effect transistor switches, small permanent magnets and a stainless steel band to act as a magnetic shutter could also be used.)

The cell blocks 58 (see, FIGS. 16A-D) can be formed of any suitable material and, as above-mentioned, each contain, in the present illustrative case, eight cell point pins 59. The latter are of cylindrical body configuration and are mounted in eight corresponding vertical holes 59a which are a running fit to the pins. The pins may be made of any suitable hard material and are caused to move up or remain down by the printhead assembly 69 as the cell blocks 58 are carried past the print point 50. The pins are retained in a set position (up or down) by the detent action of respective balls 83. Balls 83 are arranged in holes 84 which cross holes 59a, thereby allowing the balls to be pressed by a surrounding elastomeric band 86 into one of two vertically spaced detents or grooves 85 in the pins 59. Band 86 exerts sufficient force on the pins to resist but not prevent their rational and axial movement.

The upperparts or heads of the pins 59 are shaped as ramps, while the detents of the first column pins 87 and those of the second column pins 88 are situated on opposite sides. The lower sections of the pins also vary in that the first column pins have a bevel which ends slightly forward of the pin centerline at 89, while the bevel of the second column pins ends slightly aft of the pin centerline at 90. These features allow for equally spaced mechanical operations between successive rows of pins of successive cells, while also allowing for the spacing between such rows of successive cells to be greater than the spacing between the rows of the same cell. The pins 59 each also have a "vee" groove track 91 across the bottom ends and have two partial flats 92 in their lower sections.

Figure 17A:
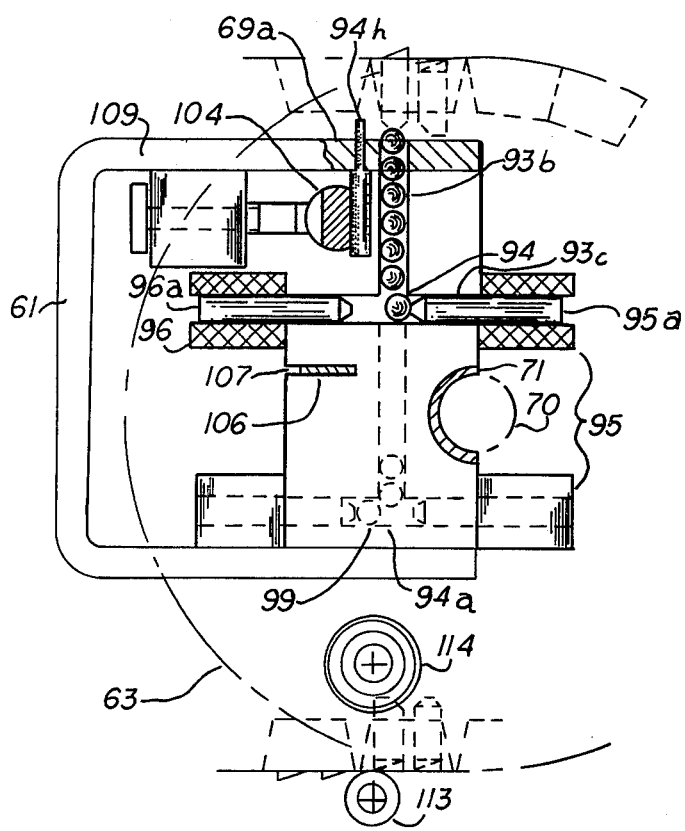
FIGS. 17A–C illustrate a vertical section, and elevation and sectional views of the print head assembly of the display mechanism of FIGS. 15A and 15B.
Figure 17C:
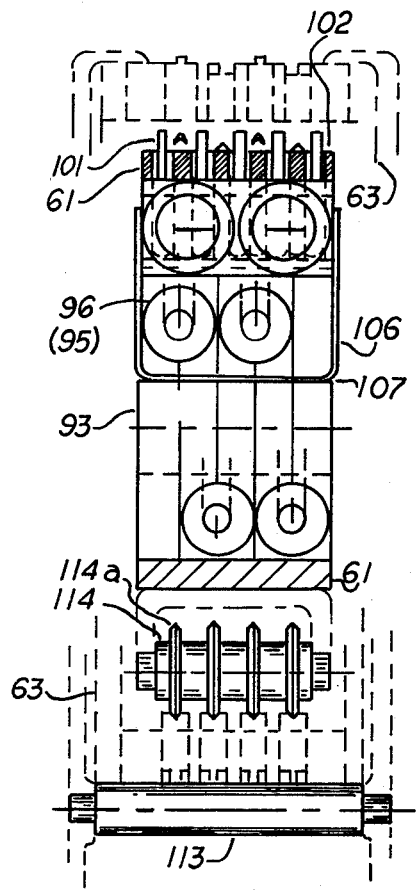
Figure 17B:
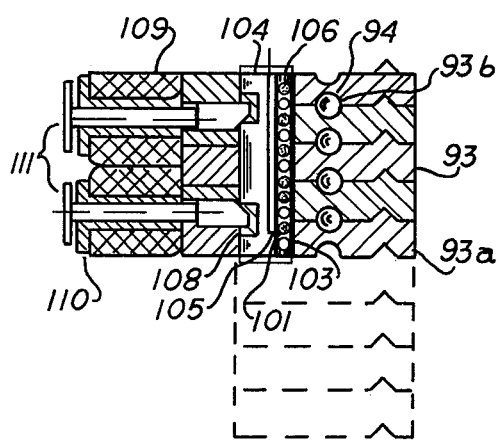

FIGS. 17A-C show the printhead assembly 69. This assembly, as above-noted, is supported in the bracket 61 precisely between the tail pulleys 63. A block 93 comprises five nesting cast or molded plates 93a, which may be made of any suitable hard material. These plates define four laterally spaced vertical bores 93b, alternate ones of which extend to a lower vertical point. The plates 93a further define transverse bores 93c which extend through the block and each of which intersects the lower end of a different vertical bore 93b. Balls 94 fill each vertical bore 93b, the lowermost ball 94a being situated in the corresponding transverse bore 93c.

Corresponding up and down solenoids 95 and 96 are situated at opposite ends of the transverse bores, with the cores of each solenoid extending preselected distances into their respective bores. Thus, the core 95a of each up solenoid 95 extends to a point which allows the lowermost ball 94a to contact it at a point where the ball centerline is beyond the bore centerline in the direction of the core. The core 96a of each down solenoid 96, in turn, extends to a point which allows the lowermost ball 94a to contact it at point where the ball centerline is appreciably beyond the vertical bore centerline and, therefore, the ball column centerline in the direction of the core. A substantial part of the lowermost ball 94a thus passes into the corresponding transverse bore where it contact the core.

By momentarily energizing the respective up and down solenoids 95 and 96 adjacent a given transverse bore 93c, the column of balls in the associated vertical bore 93b can be made to move minutely up and down by the shuttling movement of the lowermost ball 94a. In particular, when an up solenoid 95 is momentarily energized the lowermost or latch ball 94a moves to the right adjacent the core 95a, causing the column of balls to rise to the elevation shown in FIG. 16B so that the highest-most or head ball 94h moves up and as a result engages the bevel of the next cell pin 59 as it passes through the printpoint 50. This pin is thus raised resulting in the printing of the given cell point. Since in this position the latch ball 94a comes to rest slightly to the right of the column centerline, the column is solidly locked in the up position. Furthermore, since the snap action point of the ball 83 of the actuated pin in transferring grooves 85 occurs on or before the pin centerline reaches the printpoint 50, the printhead can be reset to down position on or slightly before the pin passes such printpoint.

When a down solenoid is energized, the latch ball 94a shuttles to the position shown in dotted line at 99 adjacent the core 96a. The column thus unlocks, collapses and the head ball 94h is lowered to the position shown in dotted line at 100 (FIG. 16B), this position being below the bottom of the next pin which is thus not printed as it passes through the printpoint 50.

Each of the solenoids 95 and 96 may be energized immediately after a pin reaches the detent snap action point, without changing the pin state because the minute power required to move the ball column up and down is selected to be insufficient to overcome the much greater detent ball pressure and thus the pin state will not transfer under load. Each solenoid, however, may be energized or deenergized and its respective column triggered to rise or fall as soon as the trailing edge of the vee track of the passing pin leaves the printpoint. It is to be noted that these precisely controlled movements can be made minute, that transfer loads of the ball columns can be made to be less than one gramme/millimeter, that the air gaps of the solenoids can be made small, thereby permitting printhead action at very high mechanical binary state transfer rates.

Figures 16A, 16B, 16C, 16D:
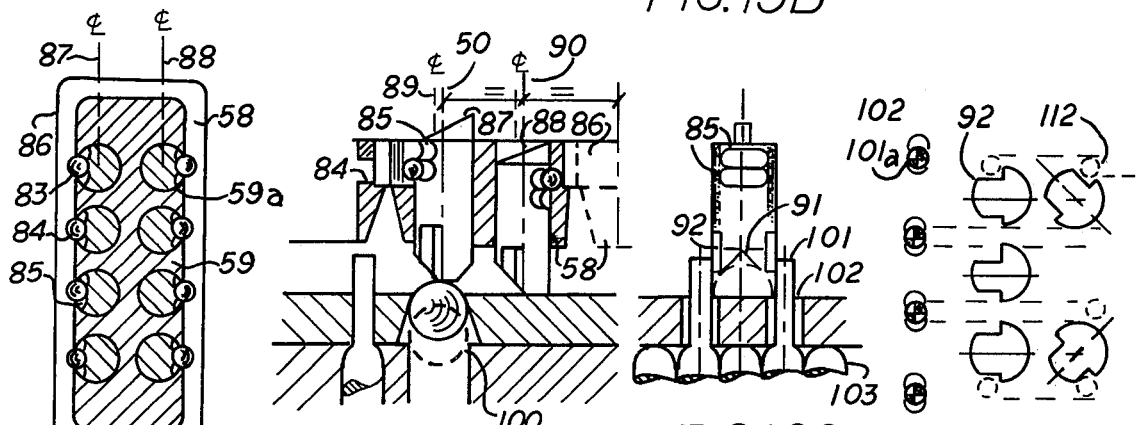
FIGS. 16A–16C show a section plan view and vertical section views of print cell blocks and pins of the display mechanism of FIGS. 15A and 15B.
FIG. 16D shows the pin relationship relative to the print head of the mechanism of FIGS. 15A and 15B.

In order to print tactile cells in accordance with the invention, the print head 69 is further adapted to include a fonting assembly for rotating the pins of the cell blocks to provide an orientation of the ramp pin heads associated with the desired font of the character being printed. The fonting assembly includes a row of nine roller bearings situated in a lateral slot 69a in the printhead block 93. More particularly, five of these roller bearings 101 have pins 101a which extend through holes 102 provided in the bracket 61, while the remaining four bearings 103 are shorter and terminate at the bottom of the bracket. A cylindrical cross slide 104 with an elongated slot 105 holds the roller bearings firmly in line. The slide is centered in the printhead block by a thin leaf spring 106 which is held in place across the block in a lateral slot 107. In the centered position, the pins of the bearings 101 are positioned so that the pins 59 of the cell blocks 58 pass undisturbed between them as shown in FIG. 16C and no rotation of the cell pins occurs. This results in orientation of the ramp heads of the cell pins in the horizontal direction corresponding to the lower case font, as discussed above. In passing the bearing pins 101a, which act as a font comb, the clearance of the cell pins can be in mils.

The slide 104 also has on its side opposite the bearings, two smaller laterally spaced slots 108. Mounted adjacent this side of the slide are two solenoid coils each including a bevelled non-magnetic plunger 109 with a steel pole plate 111 and a cylindrical core with an extended diameter face plate 110. When a solenoid is energized, its pole plate 111 is pulled into contact with its face plate 110 causing its bevelled plunger to overcome the force of leaf spring 106 of the cross slide 104 laterally. This movement causes the bearing pins 101a to be situated precisely at a point where the pins engage the cell block pins 59 in the manner shown in FIG. 16D. Thus, the bearing pins will be moved in one or the other lateral direction depending on which solenoid is actuated and will engage the flats 92 of the cell pins rotating same to the position associated with the font to be printed. The cross slide and, therefore, bearing pins may be reset as soon as the cell pins reach the pin disengagement point 112.

When a solenoid 109 is energized its pole plate 111 becomes magnetically welded to the core face plate 110 during the period of energization and accordingly the corresponding bevelled plunger translates and rigidly holds in translated position cross slide 104. Upon solenoid deenergization, the leaf spring 106 returns the slide 104 to its original centered position.

Cell pins which are raised by the printhead are reset to below the band surface after passage across the reading window 3 by the action of a roller 113. A second roller 114 in opposing relationship to roller 113 has blades 114a which engage with the vee grooves 91 of the cell pins. Pins which have been rotated are thus counterrotated and returned to their original orientation. The pins of the cell blocks are thus brought to the printout 50 in the down horizontally orientated position.

The tape transport assembly 54 of the reader 2 may be of conventional type utilizing three motors (stepping motor, rewind motor and take-up motor) to achieve constant tape speed or, preferably, is as shown in FIGS. 18A-B. As shown, the transport includes a single gearmotor 55 (FIG. 14B) which typically might have two speeds, one speed providing fractional revolutions per second for reading and the other providing high revolutions per second for rewinding. The output drive wheel 116 of the gearmotor is in frictional contact with one of two thin, magnetically transparent rigid clutch plates 117 which are in frictional contact with each other and therefore rotate in opposite directions. The clutch plates face and are in coaxial alignment with two thin flexible, steel clutch discs 118 which carry conventional tape capstans 124. The clearance between these disks and plates is small and, preferably, in mils.

Two drive balls 119 are held in constant contact with the clutch plates 117 by the supported leaf springs 120. Forward and reverse drive solenoids 121 and 122 are situated at opposite ends of the clutch plates in alignment with the drive balls 119. Brake solenoids 123, in turn, abut opposite ends of the clutch discs 118. These elements are all magnetically shielded from the tape cassette. Operation of the tape transport assembly is as follows.

When either drive solenoid is energized, the facing clutch disc 118 snaps into an instant nutating drive with the already rotating drive ball 119, thereby causing rotation of its tape capstan 124. When the drive solenoid is de-energized and the brake solenoids 123 momentarily pulsed, tape capstan rotation and, therefore, tape transport stops instantly in a locked halt, free of tape snatch, shock or coasting in either spindle and electronic jitter.

It should be noted that airgaps and element flexures required in the present transport assembly can be much less than those needed for contact make and break in a magnetically operated reed switch to which the design is somewhat analogous and therefore clutch rise and decay times may be expected to be of a very fast order. It then follows that extremely sharp angular increments can be imparted in either direction to the tape capstans 124 and given that these capstans need only rotate very slowly for normal system feedforward requirements, it is apparent that the present tape transport assembly can provide starts and stops within a fraction of a degree of spindle rotation. This high speed clutching and declutching enables the tape transport assembly to be operated in a number of modes.

In a first mode, the take-up capstan speed is constant, in which case the tape transport speed constantly increases as the takeup spool grows in diameter. In a second mode, the tape speed is constant, in which case the takeup capstan speed is proportionately slowed as the takeup spool grows in diameter. In either case, the starts and stops of the capstans are controlled by feedback programs as discussed hereinafter, one program being used during the reading operation and the other during the recording operation which is carried out in conjunction with a writer also to be discussed hereinafter.

The first mode of operation may be used for reading from prerecorded tapes which have been recorded with equidistantly spaced instructions arranged to feed forward in conventional files or blocks of instructions as the reader's or writer's gating controls permit. In this case, the tape speed is ignored (for a 300 foot tape casette tape acceleration is about 2 to 1 from an empty to a full takeup spool) and a prerecorded clock band is used to control the starts and stops as the programs require.

The first mode may also be used for recording (writing) on blank tapes in which case the tape is transported for a predetermined time period that is long enough to allow an economical amount of tape to be passed over the magnetic heads as they record one or more instructions and a clock band on the tape. The clock band thus recorded can then be used for controlling the readback rate as previously described.

It will be observed that this first mode of operation results in a gradually increasing amount of tape being used as the tape speed increases and it is noted that this increased useage is considered acceptable for the purposes of this invention, since it is outweighed by the realization of a considerably less expensive less complicated tape transport assembly. The latter, in turn, is due, amongst other things, to the use of a single gearmotor 55, instead of multiple motors as are used on most conventional tape transport assemblies.

The second mode of operation, which utilizes the same basic components as the first mode, can be used for prerecorded tapes when a constant tape speed and readout is desirable. In this case, the gearmotor starting voltage (empty takeup spool speed) is set at some predetermined rate and the clock band frequencies are checked against a system clock or strobe and a continuously variable voltage reduction is controlled by matching the clock band events against the controlling strobe frequency. The advantages of this mode are audible quality consistency and that with an instruction band carrying write out instructions and another carrying voice over, the system can exactly simulate the voice/sight classroom situation of an instructor using a blackboard.

Figure 19:
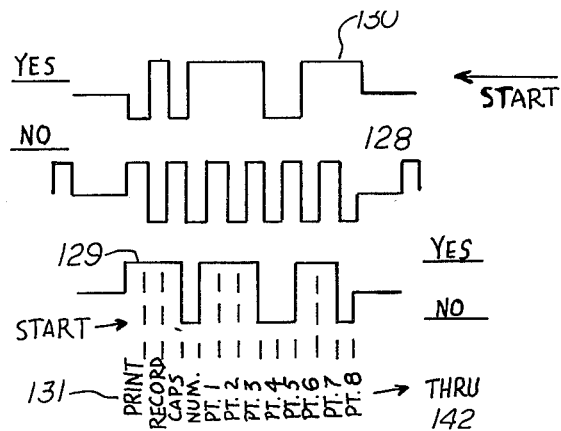
FIG. 19 shows the format for recording on the tape of the assembly of FIGS. 18A and 18B.

FIG. 18B shows three parallel read/write tape heads 126, 127, 128 which may be used, with the necessary amplification, to read and write from the tape carried by the tape transport assembly. These heads may be situated in staggered fashion or in a straight line across the tape, the center head 125 being designated as the clock band head and the other heads 126 and 127 as instruction heads, band #1 and band #2. The tape has three corresponding recording bands whose formats are shown in FIG. 19.

The center recording band is designated as the clock band and the others as instruction bands #1 and #2. As shown at 128, the clock band comprises a fixed pulse count series preceded by a start pulse (not shown), with each series being separated by a minimal deadband. The instruction bands 129 and 130, in turn, comprise a series of electro-mechanical yes/no control statements starting with print/don't print 131 record/don't record 132, Capitals/Not Capitals 133 and Numerics/Not Numerics 134, neither of the latter two instructions 133 and 134 being lower case and both being a mixed font. These preliminary instructions are followed by the instructions for printing the particular indicia of a cell associated with the character being printed. Thus, signals for indicia at points 1,2,3,4 are followed by signals for indicia at points 5,6,7,8, these signals being shown at 135 thru 142. Each instruction is either an up statement or a down statement for correspondingly setting the printhead up down solenoids 95 and 96 as the cells are passed over the printpoint 50. It is to be noted that instruction band #1 is read when the tape is being moved from left to right and instruction band #2 when the tape is reversed by switch 51 and moved from right to left.

Figure 20:
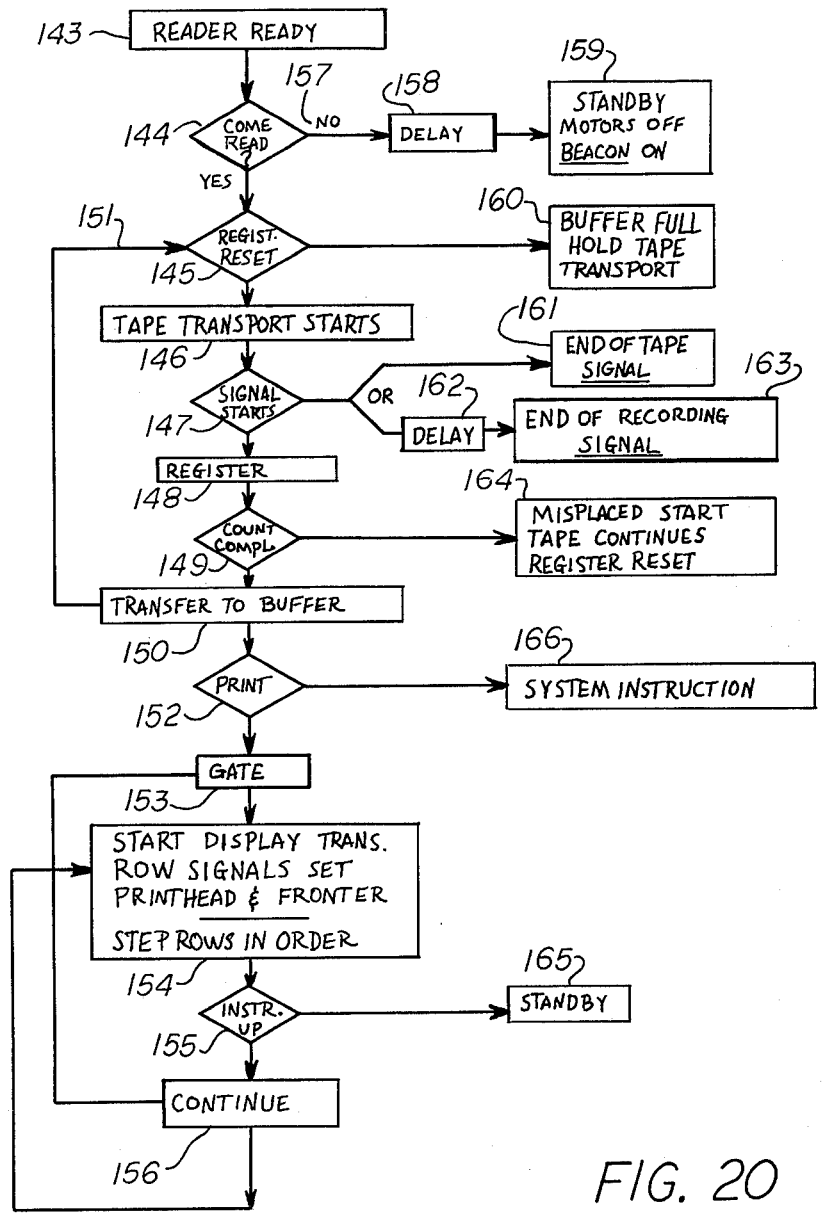
FIG. 20 illustrates the control system of the reader of FIG. 13 in the form of a sequential logic diagram.

Having discussed the mechanical aspects of the tactile reader 2, attention will now be directed to the electronic components which will be discussed in terms of the sequential logic diagram shown in FIG. 20. In FIG. 20, manual and automatic functions are depicted by rectangular shaped elements and the conditions to be met by diamond shaped elements. Reader operation (print cycle) continues in a downward yes direction unless diverted by a no condition, in which event the action to the right of a diamond takes place.

More particularly, readout from the reader starts in the READER READY state 143 that is, with a prerecorded tape in place, switch 46 in the slow position, switch 47 in the forward position, switch 51 in the Band #1 position, power supplied and switch 48 moved to the readout speed required. With these conditions the reader control circuit is energized, the tape transport gearmotor 55 runs at low speed and the variable speed display mechanism gearmotor 54 is energized to the readout level set.

As above-noted, readout is then started by the user placing a finger across the tape strips 49. The COME-READ state 144 is thus set to yes and, if the reader has been reset from the last operation, the REGISTER-RESET 145 state will also be at yes. Under these conditions a tape read cycle proceeds. The TAPE TRANSPORT START state 146 is initiated by energising the forward feed solenoid 121, energising the clock band and Band #1 readheads 125 and 126. Signals are then read by these heads at the amplified SIGNALS START state 147 in the parallel series format shown into a serial in parallel out instruction REGISTER 148. The contents of this register, after a specified count initiates the COUNT COMPLETE state 149, are then transferred into a BUFFER 150 and the REGISTER 148 is reset at 151 and made ready to read the next instruction. The BUFFER 150 consists of a read and write memory with parallel in-parallel out, first in-first out operation and with enough storage to allow convenient sentence blocks to be fed forward for printing.

The instructions in BUFFER 150 are fed through a PRINT(DONT PRINT) filter 152 which culls out non-print reader instructions, while command instructions for appropriate cell pin actuation are passed via GATE 153 to PRINT state 154. The latter processes same via an INSTRUCTION UP state which causes pawl solenoid 74 to be energized releasing ratchet 66. Gearmotor 53 then drives the display band 56 forward across the printhead and fonter assemblies which receive energizing signals for printing the tactile information one cell row at a time. Synchronization is realized by signals received from the photo-electric switches 80 and 81 as they make and break in response to the passing slots 79 in the band 56.

The above sequence of tape-read, instruction transfer, continue tape read and instruction printout, result in a CONTINUE state 156 until or unless one of the following conditions occur: (a) If the user's finger is removed from or ceases to bridge switch strips 49 the COME-READ state goes to no at 157, in which event the reader operation, after a period set by DELAY 158, is placed in a STANDBY state 159. In this state both the tape transport assembly and display mechanism drive motors are deenergized, while the control remains on and a periodic audible BEACON starts, thus conserving power while providing the user with a reassuring location signal. The reader may be restarted at any time at the rate set by restoring the COMEREAD state. (b) If the REGISTER RESET is not in reset state when a COMEREAD state is yes, due to the BUFFER FULL state 160 indicating the BUFFER is fully forward loaded, the tape transport gearmotor 55 is deenergized until the current instruction is processed and printed. At this point, the BUFFER 150 can accept further signals and the tape transport is automatically energized. The next tape increment is then fed forward and the reading process continues. (c) If an END OF TAPE signal appears at 161, this condition being detected by some conventional means, the reader is again switched to STANDBY and another audible message sounds, unless, the tape and switch 51 is switched to band #2, in which event the tape drive direction is reversed and readout continues. (d) If signals do not appear after the tape has been transported for a given time determined by DELAY 162, the reader again switches to STANDBY and an END OF RECORDING state 163 is reached, in which case an audible message sounds. (e) If the clock band count is incomplete thus establishing a MISPLACED START state 164, the register is reset and the tape transport continues to the next whole instruction. (f) If there remains no instructions in the BUFFER in which case the display band transport is stopped (pawl 75 solenoid is deenergized) and the unit goes to STANDBY 165 after a given delay.

It should be noted that the non-print related instructions for such as file and place count signals, audible messages, search routines and the like culled at GATE 153 are separately handled while the display printout, which is, electronically speaking, rather slow, proceeds at a steady uninterrupted pace.

The discussion above has focussed on the tactile cells and tactile reader aspects of the present invention which permit tactile reading with the reader from prerecorded tape. The discussion to follow now looks to the tactile writer 4 of FIG. 1 which when combined with the previously discussed components, permits recording on the tapes of the reader as well as writing directly on the band of the reader and, thus, completes the overall tactile system.

Figures 21A, 21B:
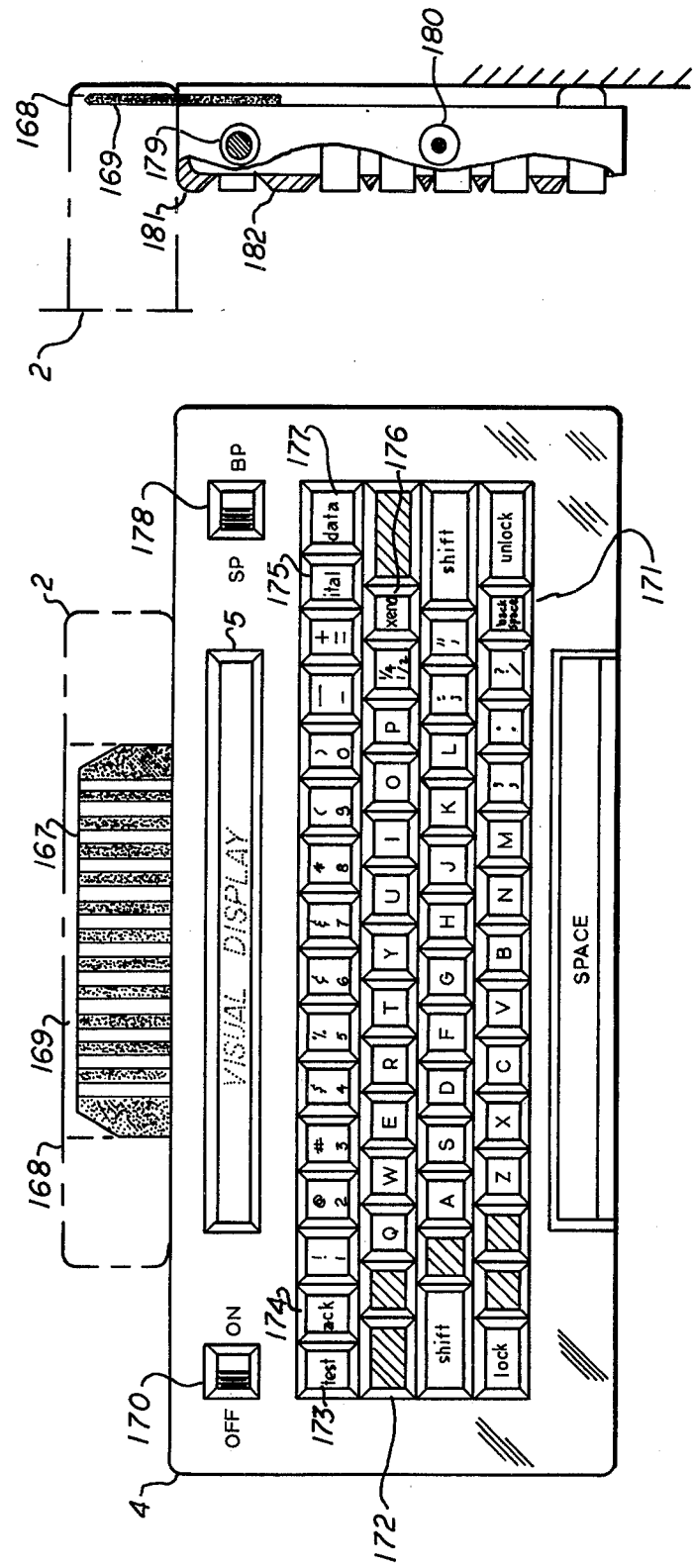
FIGS. 21A and 21B illustrate plan and side views of the writer assembly of FIG. 1.

FIGS. 21A-B illustrate the tactile writer 4 which includes a keyboard 171 having at its back end a tongue or connector 169 carrying electrical contact strips 167. The tongue 169 is adapted to mate with a narrow cross slot 168 of the reader 3 (see FIG. 14A), this slot being situated opposite the reading window 3. The slot 168 also has contact strips 167a complementary to strips 167. In use, the tongue 169 of the writer 4 is slid into the reader slot 169 so that the reader 3 is held in an upright position at the back end of the writer 4 with the viewing window 5 in visible position. Electrical contact is realized by overlap of the strips 167 and 167a. It is to be noted that with the large areas and the snug fit and slide action provided by the tongue and groove, a self cleaning electronically tight contact condition is realized.

With the writer 4 connected to the reader 3 in the manner described, movement of the on/off switch 170 to the on position causes the writer to take power from and, in turn, control the reader.

The keyboard 171 of the writer has a standard typewriter layout with all the keys and functions required for an ordinary typewriting machine. These include all keys for alphanumerics and other marks usually found plus capitals shift, shift lock and unlock, forward space and backspace, as shown. The shaded keys 172, to be situated where most convenient, are for the system requirements described below and for the mechanical functions of line and page control (carriage return, upspace, downspace, horizontal tab, bell and clear keyboard). The keyboard can be any standard electronic typewriter module with the required layout and with an accepted standard input/output coding (e.g., ASCII-American Standard Code for Information Interchange or equivalent). Additional keys provide access to and the control of at least the following essential system microprocessor functions which will be discussed hereinafter with reference to the control system of FIG. 22: test and acknowledge (keys 173 and 174) for an audible annunciator subsystem, an italics font and circuit (key 175) for adding cell Point #7 to a character, a foreign font and circuit (key 176) for adding cell point #8 to a character, a calculation function (key 177) for access to a supplementary scientific level calculator module and an all numerics keyboard (the first letters being used for numbers while the rest of the alphabet is used for mathematical signs and scientific notation); and microprocessor provisions for automatically inserting file gap signals and other (shaded) keys to provide for elective access to search and homing routines interfacing with other systems and tape editing routines with at least the essential functions of delete (erase, close up) and add (insert, move along). The remaining features of writer 4 are visual readout 5, and a two position switch 178 for preselecting a tactile printout or a sight printout recording mode—B/P or S/P.

FIG. 21B shows provisions for an external connection 179 and an earphone jack 180 for audible privacy. Also shown is provision in the housing for preventing the accidental operation of any keys or switches without interfering with normal operation. Thus, recessed surroundings 182 angled back from the keys are provided, these surroundings, while not impeding the operator's finger movement, making it impossible for one finger to strike two keys at the same time. The choice of finish and colors are the same for the same reasons as those for the reader and the two make a balanced, tactiley clear working layout.

Figure 22:
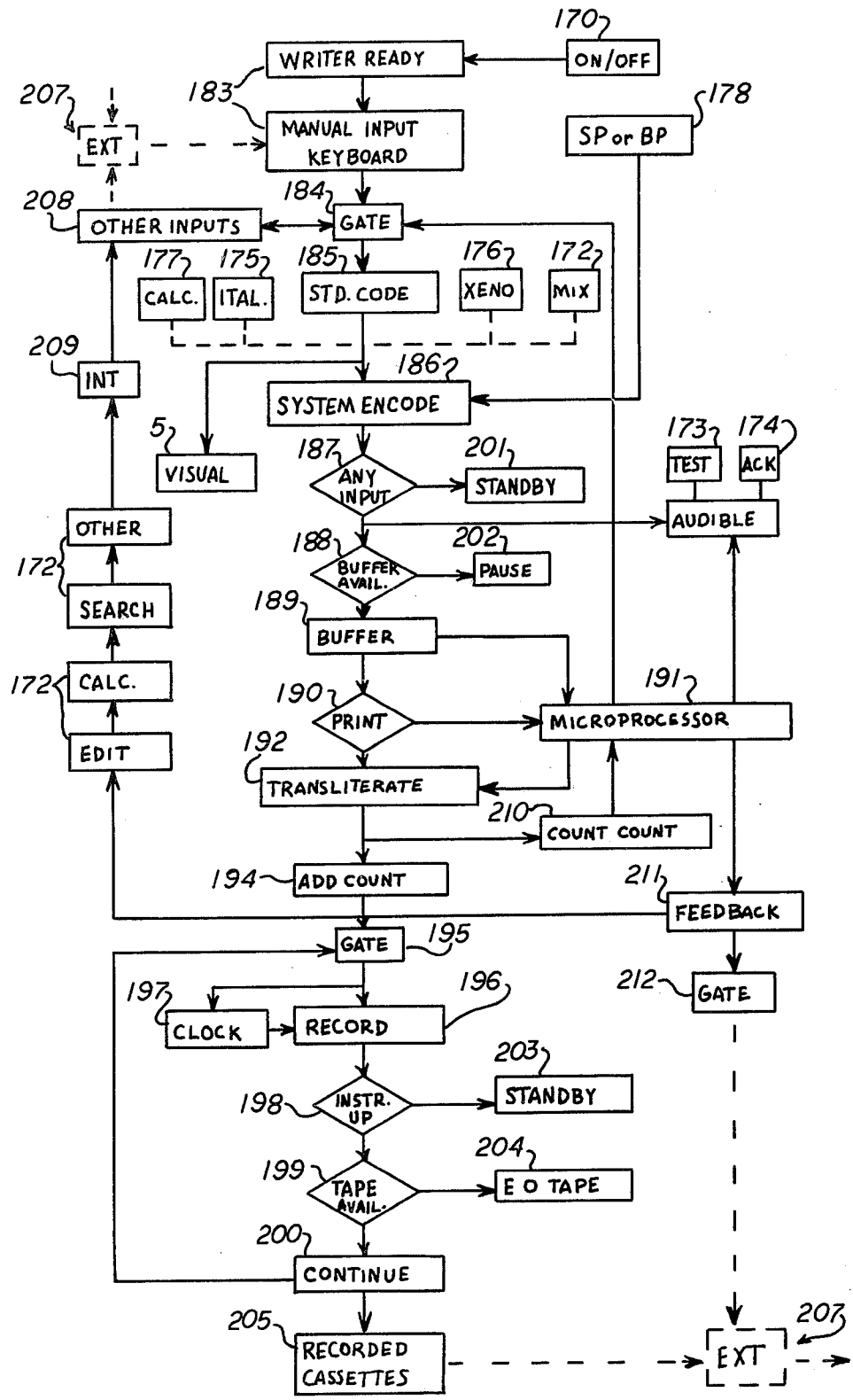
FIG. 22 shows the writer control system in the form of a sequential logic diagram.

FIG. 22 shows the writer control system in the form of a similar type sequential logic diagram as used for the reader. Operation of the writer is as follows.

With the writer at the WRITER READY FOR USE state 183, that is, with the reader having an unrecorded tape in place, the reader controls set on slow forward and band #1, the reader connected to the writer and the printout mode set on B/P or S/P shown at 178, the action of switching on via key 170 energises the electronics system and sets the tape transport gearmotor 55 running at the recording speed. At this time, the display mechanism gearmotor 53 is not energised unless required for readback. By audibly announcing power level and readiness status messages, the writer signals the user that it is ready and that normal typewriter operations can proceed.

Then with an (ASCII or eq.) input passing from the KEYBOARD state 183 through the system control GATE 184 the standard code format 185 is first encoded to the WRITER MACHINE LANGUAGE at state 186. Then, with the ANY INPUT state at 187 indicating yes and BUFFER AVAILABLE STATE 188 at yes, the coded input instruction is passed to the BUFFER 189. The BUFFER 189 is a parallel in-parallel out, first in-first out, feed forward, read and write memory with enough capacity to store convenient blocks of instructions to be automatically input and fed forward. Then, if the instructions indicate yes for PRINT STATE 190 and are to be recorded in sight-print, they are passed through the BUFFER 189 to the next cycle steps. If, however, the printout is to be in the tactile form, the letters of each word are first accumulated until a "space" indicates the end of the word and then the word and its parts are routed through a system MICROPROCESSOR 191. The MICROPROCESSOR is conditioned to examine the input word and its letter combinations and to convert same using standard Braille permutations (symbols, contractions, whole words, part words and the like) into the format discussed for the reader tape. The converted signals at TRANSLITERATE state 192 are then moved to the next machine cycle steps. These are first the culling of system instruction indicating the PRINT STATE as no at 193 to the MICROPROCESSOR 191 and the automatic addition of file, phrase, and or sentence gap counts at ADD COUNT state 194 to the transliterated signal for use in later search state routines. After passing through GATE 195, the INSTRUCTION UP at 198 is recorded as follows. First, the forward clutch solenoid, the clock band and the Band #1 write heads are energized and then the system clock 197 is stepped for an instruction length series in series parallel with the instructions, while both are recorded simultaneously on the tape. Then if another instruction is up at 198 and the TAPE AVAILABLE state is yes, the tape transport and the next instruction recording cycle continue at CONTINUE state 200.

If, however, there is no input from the keyboard for a delay period, the system switches to STANDBY 201 in the manner described for the reader or if, the BUFFER 189 is not available the system pauses at 202 (the keyboard being momentarily deenergized) or if there are no instructions up, the system goes to STANDBY at 203 and if Band #1 has run out an END OF TAPE signal 204 sounds. In this event the user switches to Band #2 on the Reader/Recorder, the tape is driven in reverse, and the prerecorded clock band signals are used for the series parallel stepping and recording of the Band #2 instructions.

A recorded tape at RECORDED CASETTES state 205 may be back spaced or rewound to any point at any time for tactile readback in the manner described for the reader, with or without the keyboard attached, and with the keyboard attached Sightread via visual readout 5 which can be of any convenient length. The readout 5 may be driven directly from the standard coded keyboard and simultaneously provides the sighted with a running readout. The readout may comprise a number of state-of-the-art liquid crystal display (LCD) dot matrix units with a rolling writer readout drive.

The annunciator audible system at AUDIBLE 206 provides the handicapped user with audible feedback in the form of coded key tones. These are necessary because the system is essentially noiseless in operation and the provision of at least face, font and function group tones for operator assurance are indicated.

The remaining logic portions are as follows: EXT at 207 indicating the writer's interface point with other systems; OTHER INPUTS at 208 indicating internal feedback at INT 209 from SEARCH, CALC., EDIT and other system routines at 172, COUNT COUNT (of prerecorded tape) at 210 as a function of the search and homing routines, FEEDBACK at 211 provides forward loop control and an external gate control at GATE 212.

It is also possible with the writer and reader combination to realize simultaneous or interposed verbal messages using Band #2 in parallel or parts of Band #1 in series for voice recording and playback through an audio amplifier. Thus, a teaching commentary/illustration series for learning the basic skills of the print tactile system can be readily discerned, and with equal ease so can lecture tapes of a university level with the instructor's dialogue running with the blackboard illustrations of the tactile reader.

The above discussion has described the tactile cells of the inventions as well as a tactile reader and writer used in conjunction with such cells. It should be noted, however, that the reader and writer components can be used with conventional Braille cells as well. Furthermore certain components of the reader have application to other Braille systems as well as to other information systems in general.

More particularly, the printhead assembly of the tactile reader can be used in conventional printers to provide rapid embossing of deformable medium. Thus, the head may be used as a single line printer in an otherwise ordinary typewriter, or as a multi line continuous printer by employing a row of printheads in a continuous sheet printing machine or as a tactile graphics embosser for producing three-dimensional illustrations.

FIG. 23 shows the last mentioned type of apparatus. As shown, a plurality of base modules 93a akin to the successive plates 93a of FIGS. 17 A-C are arranged to provide vertical bores and corresponding transverse bores for receiving ball columns (not shown) and respective up and down solenoids 95a, 96a, again in the manner taught in the aforementioned figures. Embossing pins 213a situated at the top of the ball columns mate with the apertures 214a in a die plate 214. Selective actuation of the pins 213a permits placement in medium 217 of embossments at any or all points as the medium passes between the print head and die.

The die plate has an indentation 215 at its forward end so that embossed areas will not be crushed as they leave the plate. With this apparatus half tone illustrations may be made in a dot matrix and further by regulating the medium feed to less than an equidistant matrix and by also slightly moving the printhead and die plate assembly laterally, it is apparent that continuous lines as well as curved lines may be imprinted. Thus, infintely variable textured designs on various media (e.g., wallpaper) can be made for decorative purposes.

One further component of the reader which can be adapted for use in other information systems, is the reader tape transport system, the details of which have been discussed hereinabove.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What I claim is:

1. A tactile cell comprising:
a number of one or more tactually perceptible indicia; and means for tactually conveying font information corresponding to the cell, said means being included in at least one of said indicia and corresponding to a first orientation of said one indicia which provides a first tactual sensation indicative of said font information.

2. A cell in accordance with claim 1 wherein:
said font information is indicative of one of a lower case font, an upper case font and a numerics font.

3. A cell in accordance with claim 1 wherein:
said one indicia has a thin ramp shape having said first orientation.

4. A cell in accordance with claim 1 or 3 wherein:
said indicia are spaced at a distance approximately equal to the mean threshold level of two point sensory perception.

5. A cell in accordance with claim 4 wherein:
said cell spacing is approximately equal to 3.5 mm.

6. A cell in accordance with claim 4 wherein:
said first tactual sensation is conveyed by each of said indicia;
and each of said indicia have said thin ramp shape and said first orientation.

7. A cell in accordance with claim 1 or 6 wherein said cell has six locations arranged in two columns of three locations, each of said one or more indicia being at a different one of said locations.

8. A cell in accordance with claim 7 wherein:
said indicia are from one to six in number;
and the pattern of indicia correspond to a Braille permutation.

9. A cell in accordance with claim 8 wherein:
said cell has a seventh location located at the bottom of one of said columns.

10. A cell in accordance with claim 9 wherein:
said cell has an eighth location located at the bottom of the other of said columns.

11. A cell in accordance with claim 10 wherein:
an indicium is at one of said seventh location, said eighth location and said seventh and eighth locations.

12. A cell in accordance with claim 11 wherein:
indicium are at said seventh and eighth locations.

13. A cell in accordance with claim 10 wherein:
said indicia at said one of said seventh location, said eighth location and said seventh and eighth locations conveys additional font information.

14. A cell in accordance with claim 11 wherein:
the indicia at said first through sixth locations convey prose information.

15. A cell in accordance with claim 14 wherein:
the indicia at at least said seventh and eighth locations convey punctuation information.

16. A tactile system comprising:
a first tactile cell including:
a first number of one or more tactually perceptible indicia, said first indicia each having the same first shape so as to provide a first tactual sensation indicative of a first font for that first cell;
and a second tactile cell including:
a second number of tactually perceptible indicia, said second indicia each having the same second shape, said second and first shapes being the same, and said second indicia being differently oriented relative to said first indicia so as to provide a second tactual sensation indicative of a second font for that second cell.

17. A system in accordance with claim 4 wherein:
said indicia of said first cell are rotated relative to the indicia of said second cell.

18. A system in accordance with claim 17 wherein:
said indicia have ramp shapes.

19. A system in accordance with claim 18 further comprising:
a third cell including:
a third number of tactually perceptible indicia, said indicia being adapted to provide a third tactual sensation indicative of a third font for that third cell.

20. A system in accordance with claim 19 wherein:
said indicia of said third cell each have a third shape, said third shape being the same as said first and second shapes;
and said indicia of said third cell are differently orientated relative to the indicia of said second cell and said first cell.

21. A system in accordance with claim 20 wherein:
said first font is a lower case letter font;
said second font is an upper case letter font;
and said third font is a numerics font;

22. A system in accordance with claim 20 or 21 wherein:
said first shape is a ramp.

23. A system in accordance with claim 22 wherein:
said difference in orientation is relative rotation of said indicia of said first, second and third cells.

24. A system in accordance with claim 23 wherein:
said indicia of said second cell are rotated in a first direction relative to the indicia of said first cell and the indicia of said second cell are rotated in a second direction opposite said first direction relative to the indicia of said first cell.

25. A system in accordance with claim 24 wherein:
said first direction is counterclockwise and said second direction clockwise.

26. A system in accordance with claim 25 wherein:
said indicia of said first cell are oriented with their ramp profiles parallel to the horizontal.

27. Apparatus for producing one or more tactually sensible indicia, said indicia to be produced having a plurality of corresponding fonts, comprising:
a number of one or more rotatably mounted members, each of said members being movable between a first position whereat the member produces a corresponding indicium and a second position whereat that member fails to produce a corresponding indicium;
means for actuating the members to move the members between said first and second positions;
means for generating a signal indicative of the font of the indicia to be produced;

and means for rotating the members, said rotating means being responsive to said signal generating means.

28. Apparatus in accordance with claim 27 wherein: said rotating means is situated in one of two positions, one position preceding and the other position succeeding said actuating means.

29. Apparatus in accordance with claim 27 wherein: said signal generating means generates further signals indicative of the members to be actuated for the indicia to be produced;
and said actuating means is responsive to said further signals.

30. Apparatus in accordance with claim 29 wherein: said signal generating means comprises:
a magnetic tape system for providing signals including indicia signals corresponding to said font and member indicative signals.

31. Apparatus in accordance with claim 29 wherein: said signal generating means comprises:
a magnetic tape system for providing signals including indicia signals corresponding to said font and member indicative signals;
and electronic processing means for generating said font and member indicative signals from said indicia signals, said processing means including means for storing said indicia signals and means for generating stop and start signals for said tape system in dependence on the condition of said storage means.

32. Apparatus in accordance with claim 31 wherein: said tape system comprises a tape transport assembly including:
a single motor;
first and second rotatably mounted clutch plates arranged in driving relationship to said motor;
first and second clutch discs mounted in facing relationship to the first and second clutch plates, respectively, said clutch discs each being adapted to support a tape reel capstan;
first and second elements mounted in driving relationship to said first and second clutch plates; respectively;
and means for selectively bringing said first and second clutch discs into driving relationship with said first and second elements.

33. Apparatus in accordance with claim 32 wherein: said clutch plates are in frictional contact with each other;
said first and second elements comprise first and second drive balls, respectively, said first and second drive balls being mounted to contact and be rotated by said first and second clutch plates, respectively;
and said selective contact means comprises first and second drive solenoids for bringing said first and second clutch discs in contact with said first and second drive balls.

34. Apparatus in accordance with claim 33 further comprising:
first and second brake solenoids for stopping the rotation of said first and second clutch discs.

35. Apparatus in accordance with claim 34 wherein: said first and second drive solenoids are mounted facing the surfaces of said first and second clutch plates which are opposite the surfaces of said first and second clutch plates facing said first and second clutch discs.

36. Apparatus in accordance with claim 35 wherein: said first and second drive solenoids are in alignment with said first and second elements.

37. Apparatus in accordance with claim 36 wherein: said first and second brake solenoids are in alignment with said first and second drive elements.

38. Apparatus in accordance with claim 37 wherein: said first and second brake solenoids are mounted in facing relationship to the surfaces of said first and second clutch discs which are opposite the surfaces of said first and second clutch discs facing said first and second clutch plates.

39. Apparatus in accordance with claim 29 or 32 wherein:
said actuating means comprises:
a support block having one or more first bores and one or more second bores, each second bore running through said block transversely to and intersecting a different one of said first bores;
one or more actuators each included in a different one of said first bores and each including an actuating member slidably mounted in that bore and an actuating ball disposed therebelow in the transverse bore intersecting that first bore;
and one or more means each for moving a different actuating ball from a first position, whereat the corresponding actuating member is situated in a non-actuating position, to a second position, whereat the corresponding actuating member is in an actuating position.

40. Apparatus in accordance with claim 39 wherein: said first position is slightly to one side of the centerline of the corresponding actuating member;
and said second position is considerably to the other side of said centerline.

41. Apparatus in accordance with claim 40 wherein: each said actuating ball moving means includes:
a first solenoid mounted to said block at one end of the corresponding transverse bore;
and a second solenoid mounted to said block at the other end of the corresponding transverse bore.

42. Apparatus in accordance with claim 41 wherein: each said first solenoid has a core extending into the corresponding transverse bore to a point which causes said actuating ball to be at said first position when that first solenoid is energized;
and said second solenoid has a core extending into the corresponding transverse bore to a point which causes said actuating ball to be at said second position when that second solenoid is energized.

43. Apparatus in accordance with claim 42 wherein: successive first bores extend to different points in said block.

44. Apparatus in accordance with claim 43 wherein: the spacing between successive first solenoids is less than the lateral dimensions of each said first solenoid;
the spacing between successive second solenoids in less than the lateral dimension of each said second solenoid.

45. Apparatus in accordance with claim 44 wherein: said block comprises a plurality of interlocking block elements.

46. Apparatus in accordance with claim 39 further comprising:
means for creating relative movement between said members and said support block so that each member is brought into alignment with a first bore of said support block, whereby each member brought to a first bore whose actuating member is in actuating position is engaged by that actuating member and placed in a first indicium producing position.

47. Apparatus in accordance with claim 46 wherein: each of said members comprises a pin;
and said apparatus further comprises: a pin block having one or more slots, each of said pins being axially slidably and rotably mounted in a different slot, each said pin being slidable between said non-indicia producing second position whereat the pin front end is below the outer surface of said pin block and said indicia producing first position whereat the pin front end is above the outer surface of said pin block.

48. Apparatus in accordance with claim 47 wherein: the back end of each said pin extends outward of the outer surface of said block;
said actuating members of said support block extend above the outer surface of said support block when in the actuating position and below the outer surface of said block when in the non-actuating position;
and said relative movement means creates relative movement between said support block and said pin block, whereby actuating members in the actuating position engage the rear ends of corresponding pins thereby causing same to be moved to said indicia producing first position.

49. Apparatus in accordance with claim 48 wherein: said slots in said pin block are arranged in one or more rows;
said first grooves are arranged in a row and are equal in number to the slots in the pin block row having the greatest number of slots, said row of grooves being aligned with the slots in a given pin block row when that pin block row is situated over said groove row.

50. Apparatus in accordance with claim 49 wherein: said slots are arranged in first and second rows;
the back end of each pin of said first row has a taper which terminates prior to the center of that pin;
the back end of each pin of said second row has a taper which terminates subsequent to the center of that pin.

51. Apparatus in accordance with claim 50 wherein: said first and second rows of slots each have four slots.

52. Apparatus in accordance with claim 49 wherein: said pin block has one or more cross slots each intersecting a different pin slot;
each pin has first and second axially spaced detents and is arranged with such first and second detents toward the corresponding cross slot;
and said apparatus further includes one or more detent balls each situated in a different pin block cross slot for engaging the detents of the pin situated in the corresponding pin slot, thereby locking that pin in indicium producing first position when engaging said first detent and non-indicum producing secong position when engaging said second detent.

53. Apparatus in accordance with claim 49 wherein: said back end of each pin include first and second laterally spaced flats;
and said means for rotating comprises:
comb means having laterally spaced teeth arranged in a row parallel to the pin block one or more rows and selectively translateable so as to cause one of engagement of said teeth with the first flats of the pins in a row thereby rotating same, engagement of said teeth with the second flats of the pins in a row thereby rotating same and passage of the pins in a row without engagement.

54. Apparatus in accordance with claim 53 wherein: said comb member is mounted to said support block.

55. Apparatus in accordance with claim 47 wherein: relative movement means comprises an endless band, said pin block being supported on the interior of said band and said band having apertures aligned with the slots in said block for receiving the pin frontends when in indicia producing first position.

56. Apparatus in accordance with claim 55 further comprising:
a housing having a reading window having entrance and exit ends;
said band being supported to pass by said window from said entrance to exit ends;
said actuating means actuating said pins when said belt moves from said exit to entrance ends.

57. Apparatus in accordance with claim 56 further comprising:
means for returning each of said pins to the non-indicia producing position and non-rotated position after said pins pass said window exit.

58. Apparatus in accordance with claim 56 wherein said
actuating means is adjacent to said window entrance.

59. Apparatus in accordance with claim 56 further comprising:
contact strips adjacent said window for providing a signal for starting and stopping said relative movement means.

60. Apparatus in accordance with claim 56 further comprising:
further number of pin blocks arranged in succession and supported along said band interior, said band having further apertures aligned with the front ends of the members of said further pin blocks, said band carrying said pin blocks in succession past said support block to have selective pins supported in said pin blocks brought to the indicia producing first position by actuating members in said support block.

61. Apparatus in accordance with claim 60 further comprising:
a keyboard having keys and means for providing electrical signals corresponding to said keys.

62. Apparatus in accordance with claim 61 wherein: said electronic processor further functions to permit recording of signals corresponding to said key signals on said tape system.

63. Apparatus in accordance with claim 62 wherein: said keyboard includes a visual readout of the keys being activated.

64. Apparatus in accordance with claim 62 wherein: said keyboard includes surroundings bordering each key to prevent simultaneous key activation.

65. Apparatus in accordance with claim 64 wherein: said surroundings are tapered outwardly when proceeding outwardly from each key.

66. Apparatus in accordance with claim 56 further comprising:
a first U-shaped bracket having first and second legs spaced vertically, said support block being mounted to said first bracket between said legs; a second U-shaped bracket having third and fourth legs spaced horizontally, said second bracket being attached along the segment joining said third and fourth legs to the segment of said first bracket joining said first and second legs.

67. Apparatus in accordance with claim 66 further comprising:
first and second drive pulleys mounted in spaced relationship to said first bracket;
first and second tail pulleys mounted in spaced relationship to said support block;
said band being wound over and carried by said drive and tail pulleys.

68. Apparatus in accordance with claim 67 wherein: said housing includes a boss for supporting said first and second brackets.

69. A system comprising:
a tactile writer comprising a keyboard having a tongue at the rear end thereof, said tongue including a first electrical contact means;
a tactile reader comprising a slot at the bottom wall thereof, said slot being adapted to receive said tongue and including a second electrical contact means adapted to contact said first electrical contact means with said tongue in said slot.

70. A system in accordance with claim 69 wherein: said reader includes a reading window for providing tactile information, said window being on the surface thereof opposite the surface containing said slot.

71. A system in accordance with claim 69 wherein: said first and second contact means each include a plurality of contact strips.

72. A system in accordance with claim 70 wherein: said writer includes a readout for providing visual information.

* * * * *